US005465874A

United States Patent [19]
Roach et al.

[11] Patent Number: 5,465,874
[45] Date of Patent: Nov. 14, 1995

[54] PORTABLE MULTI-COMPARTMENT CHEMICAL STORAGE AND MIXING TANK

[75] Inventors: Matthew N. Roach, Apex; Neil P. Stapensea, Raleigh; Jon Webster, Cary, all of N.C.

[73] Assignee: BASF Corporation, Mount Olive, N.J.

[21] Appl. No.: 153,052

[22] Filed: Nov. 17, 1993

[51] Int. Cl.⁶ ............................................. B65D 83/14
[52] U.S. Cl. ................... 222/51; 222/136; 222/399; 222/529; 222/464.6; 222/145.5
[58] Field of Search .......................... 222/136, 1.45, 222/51, 399, 464, 529; 141/382; 137/614.2, 614.22; 251/148, 149.8

[56] References Cited

U.S. PATENT DOCUMENTS

| | | | |
|---|---|---|---|
| 719,846 | 2/1903 | Neubert et al. | 222/399 X |
| 2,063,727 | 12/1936 | Davis, Jr. | 222/399 X |
| 2,065,128 | 12/1936 | Eisinger | 222/136 X |
| 2,255,280 | 9/1941 | Colvin | 222/399 X |
| 2,550,356 | 4/1951 | Jarvis | 222/496 |
| 2,621,830 | 12/1952 | Stow et al. | 222/464 |
| 2,884,964 | 5/1959 | Tye | 222/145 X |
| 2,976,897 | 3/1961 | Beckworth | 222/399 X |
| 3,021,863 | 2/1962 | Low | 137/209 |
| 3,221,931 | 12/1965 | Porter | 222/399 |
| 3,256,907 | 6/1966 | Clark et al. | 222/51 X |
| 3,319,834 | 5/1967 | Steele | 222/464 X |
| 3,348,737 | 10/1967 | Yingst et al. | 222/145 X |
| 3,921,907 | 11/1975 | Anderson | 222/176 X |
| 3,967,920 | 7/1976 | Hill | 417/63 |
| 4,019,652 | 4/1977 | Suh et al. | 222/145 X |
| 4,059,123 | 11/1977 | Bartos et al. | 222/136 X |
| 4,131,214 | 12/1978 | Rogers | 222/399 X |
| 4,390,035 | 6/1983 | Hill | 222/145 X |
| 4,398,554 | 8/1983 | Kondo | 137/91 |
| 4,511,283 | 4/1985 | Duval et al. | 222/399 X |
| 4,887,651 | 12/1989 | Santiago | 222/399 |
| 4,994,180 | 2/1991 | Sims et al. | 222/399 X |
| 5,016,817 | 5/1991 | Ghate et al. | 239/113 |
| 5,082,142 | 1/1992 | Saidman et al. | 222/136 X |
| 5,150,822 | 9/1992 | Eitner, Jr. et al. | 222/145 |
| 5,205,440 | 4/1993 | Matsushita | 222/496 X |

FOREIGN PATENT DOCUMENTS 0118797  5/1990  Japan ............................ 222/83

Primary Examiner—Andres Kashnikow
Assistant Examiner—Kenneth Bomberg
Attorney, Agent, or Firm—Nixon & Vanderhye

[57] ABSTRACT

A portable holding and mixing tank system for at least two dissimilar liquids includes a tank having an interior space and a dividing wall which establishes at least two fluid-isolated holding compartments within the tank interior space for respectively holding a respective one of the dissimilar liquids. A manifold assembly defines respective channels for the dissimilar liquids and for pressurizing fluid supplied from a source thereof. The liquid and pressurizing fluid channels are fluid-connected to each of the holding compartments. A pressurizing supply conduit fluid-connects the source of pressurizing fluid to pressurizing fluid channel, while liquid supply risers respectively fluid connect the dissimilar liquids contained in each of the holding compartments to the liquid channel defined by the manifold assembly. A liquid discharge port fluid-connects the liquid channel defined by the manifold assembly. As a result, the dissimilar liquids within each of the holding compartments are forcibly introduced by the pressurizing fluid into the liquid channel defined by the manifold assembly and are mixed with one another within the liquid channel prior to discharge through the discharge port.

17 Claims, 4 Drawing Sheets

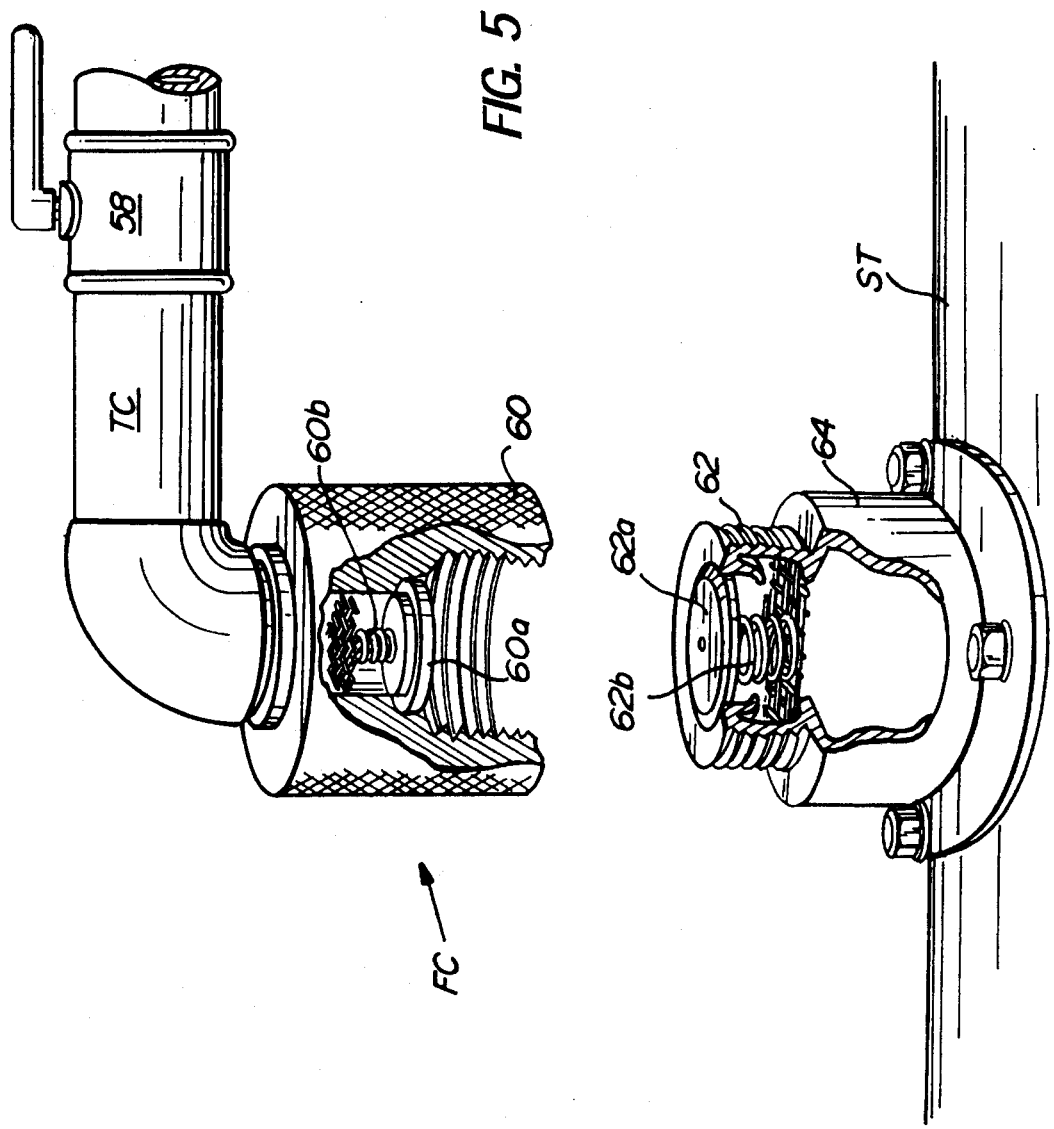

PORTABLE MULTI-COMPARTMENT CHEMICAL STORAGE AND MIXING TANK

FIELD OF THE INVENTION

This invention is related to the field of liquid storage tanks and mixing systems. In preferred forms, the present invention is embodied in a closed tank system (i.e., the tank is not open to the ambient environment) which permits storage of at least two dissimilar liquid agricultural chemicals and, just prior to application, will allow a metered mixture of such chemicals to be dispensed to an agricultural applicator.

BACKGROUND AND SUMMARY OF INVENTION

It is oftentimes desirable to apply agricultural chemicals to crops so as to stimulate crop growth, control pests, alleviate crop disease or the like. However, since agricultural chemicals are not universally effective for all desired purposes, it is typically necessary for individual chemicals to be applied separately to crop fields. Such a multiple application technique, of course, increases the time needed in order to apply the individual chemicals to the crop fields and/or requires dedicated multiple application equipment to apply the chemicals simultaneously. As a direct result, therefore, application efficiency of the agricultural chemicals is diminished, while the cost associated with application is increased.

Premixing of the agricultural chemicals in desired ratios so that a single application pass over the crop field is an attractive alternative to the abovedescribed multiple pass application technique. However, there are several real and nontrivial problems associated with premixing of agricultural chemicals. For example, many agricultural chemicals are not shelf-stable when mixed with one another. As a practical matter, therefore, such mixture instability precludes an agricultural chemical manufacturer from supplying end users with dissimilar agricultural chemicals premixed to desired application ratios.

Furthermore, the premixed agricultural chemicals would be subject to government registration procedures requiring, for example, user toxicological and product chemistry studies to be conducted prior to actual use even though each of the agricultural chemicals in the mixture have individually been registered. An exception under the government registration procedures exists, however, if the premixed agricultural chemicals can be supplied to their point of use and transferred to the crop applicator equipment without exposure to the user. Thus, even if it is assumed for the moment that the agricultural chemicals are storage-stable in the mixture, there is currently no known commercially viable means whereby the premixed agricultural chemicals can be stored and transferred to crop applicator equipment via a "closed" system —i.e., a system which precludes exposure of the user to the premixed chemicals during the storage and transfer procedures.

What has been needed, therefore, is a system whereby functionally and/or chemically dissimilar agricultural chemicals may be stored separately of one another in a self-contained tank, yet mixed in a desired ratio prior to crop application. It would furthermore be highly desirable if such a system could transfer the mixture of agricultural chemicals to crop applicator equipment without exposure to the end-user (i.e., so that the self-contained storage and mixing tank could qualify as a "closed" system for purposes of government regulatory rules). It is towards fulfilling such needs that the present invention is directed.

Broadly, the present invention is embodied in a self-contained pressurized and portable tank system whereby dissimilar agricultural chemicals can be stored separately of one another, yet are mixed at a selected ratio in response to transferal of the chemicals to crop applicator equipment. More specifically, the present invention is embodied in a portable holding and mixing tank system for liquid chemicals which includes a tank having an interior space and a dividing wall establishing at least two fluid-isolated holding compartments within the tank interior space for respectively holding respective liquid chemicals.

A manifold assembly defines respective channels for the liquid chemicals and for pressurizing fluid supplied from a source thereof. The liquid and pressurizing fluid channels are fluid-connected to each of the holding compartments. A pressurizing supply conduit fluid-connects the source of pressurizing fluid to pressurizing fluid channel, while liquid supply risers respectively fluid connect the liquid chemicals contained in each of the holding compartments to the liquid channel defined by the manifold assembly. A liquid discharge port fluid-connects the liquid channel defined by the manifold assembly.

As a result, the liquid chemicals within each of the holding compartments are forcibly introduced by means of the pressurizing fluid therewithin into the liquid channel defined by the manifold assembly and are mixed with one another within the liquid channel prior to discharge through the discharge port.

These, as well as other, aspects and advantages of the present invention will become more clear after careful consideration is given to the detailed description of the preferred exemplary embodiment thereof which follows.

BRIEF DESCRIPTION OF THE ACCOMPANYING DRAWINGS

Reference will hereinafter be made to the accompanying drawings wherein like reference numeral throughout the various FIGURES denote like structural elements, and wherein:

FIG. 5 is a perspective view, partly in section, of a preferred transfer coupling associated with the transfer conduit employed with the multi-compartment tank system in accordance with the present invention.

DETAILED DESCRIPTION OF THE PREFERRED EXEMPLARY EMBODIMENT

Figure 1:
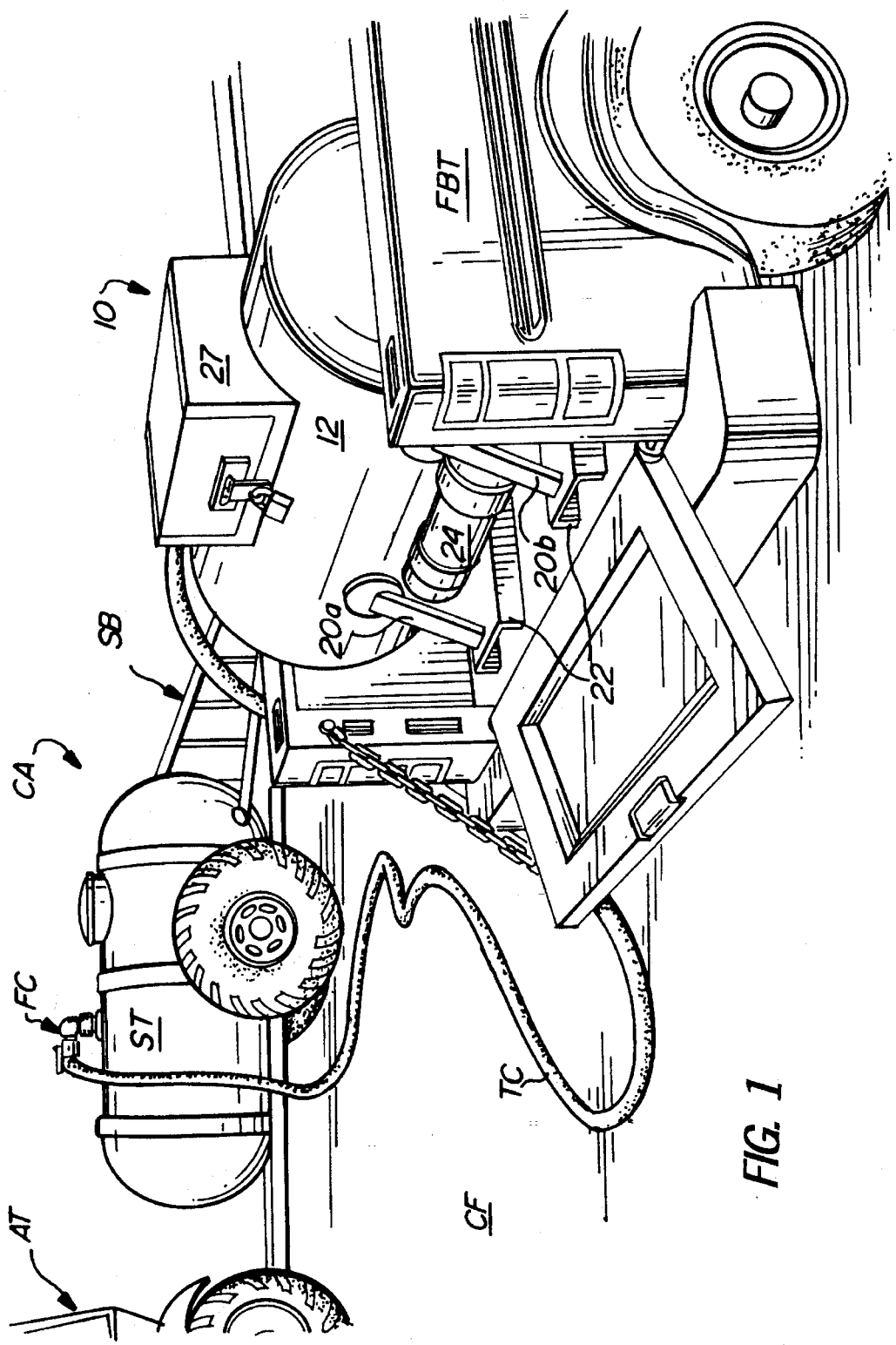
FIG. 1 is a perspective view showing the multi-compartment tank system in accordance with the present invention during an operation whereby a mixture of the individual agricultural chemicals contained thereby is transferred to crop applicator equipment.

Accompanying FIG. 1 depicts schematically the multi-compartment tank system 10 in accordance with the present invention during an operation whereby a mixture of the individual agricultural chemicals contained thereby is transferred to a wheeled supply tank ST associated with crop applicator equipment CA. As is well known, the crop applicator equipment CA may be moved across the crop field CF by any suitable vehicle, such as by the agricultural tractor AT shown in FIG. 1. The crop applicator equipment CA will typically include an application spray boom SB so that the liquid agricultural chemicals within the supply tank ST may be applied to the crop field CF at the desired application rate.

The multi-compartment tank system 10 in accordance with this invention may be brought physically onto the crop field by any suitable vehicle, such as by the flat bed truck FBT shown. Thus, the tank system 10 could be filled with the desired chemicals by the chemical manufacturer at its manufacturing facility or at a prearranged supply terminal, and thereafter shipped directly to the user. The user would then transfer the contents of the tank system 10 to the supply tank ST of the crop applicator equipment CA using a flexible transfer conduit TC equipped with a one-way flow coupling FC (to be discussed in greater detail below). The entire tank system 10 could then be returned by the end user to the manufacture for refilling purposes once the agricultural chemicals contained in the tank system 10 had been emptied into the supply tank ST.

Figure 2:
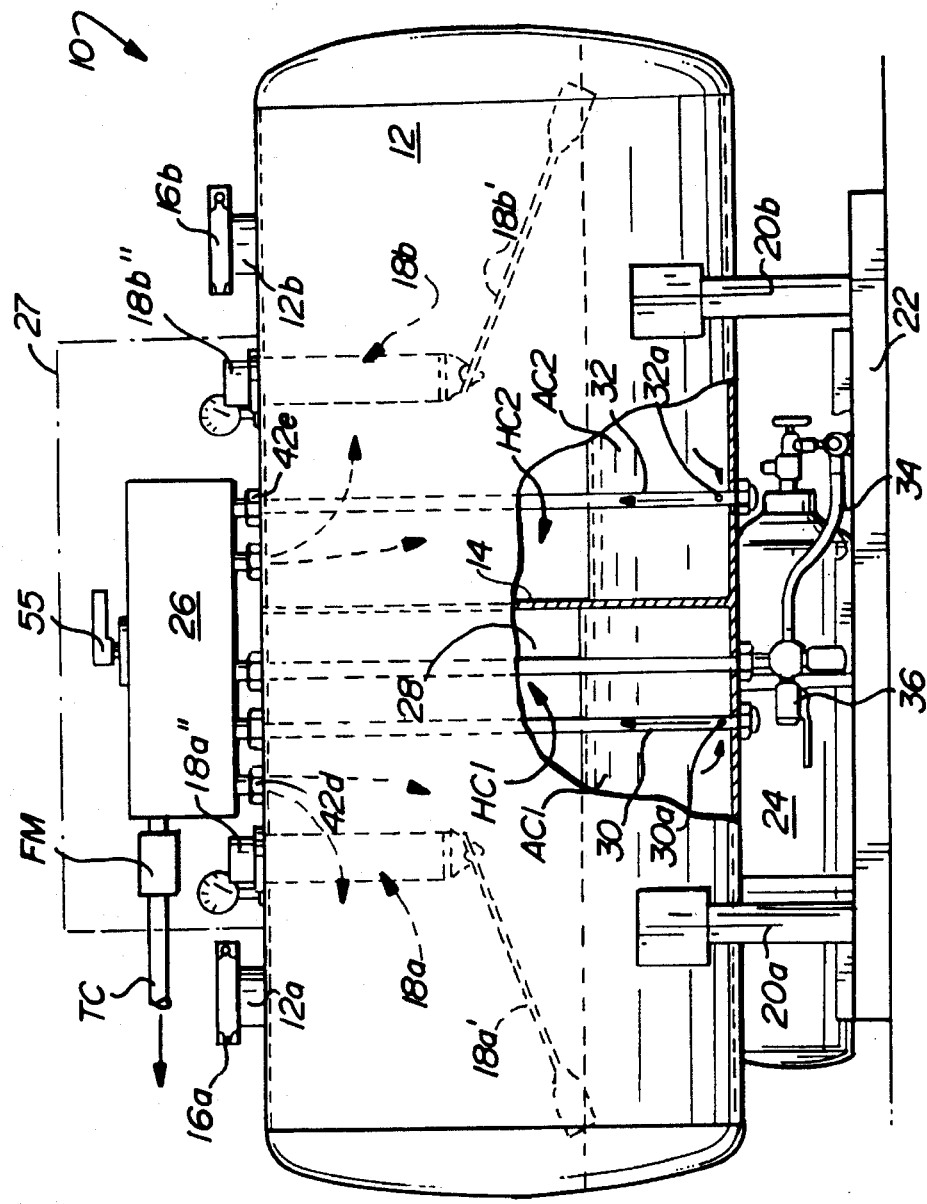
FIG. 2 is an elevational view, partly in section, of the multi-compartment tank system in accordance with the present invention.

The structural components associated with the tank system 10 in accordance with the present invention are more clearly shown in accompanying FIG. 2. In this regard, the tank system 10 will include a tank 12 having the desired geometrical configuration and volumetric capacity to contain two dissimilar agricultural chemicals AC1 and AC2. An interior dividing wall 14 subdivides the interior space of the tank 12 into two chemical holding compartments HC1 and HC2 for respectively holding the agricultural chemicals AC1 and AC2. The compartments HC1 and HC2 are, moreover, isolated from one another by virtue of the dividing wall 14 so as to prevent premature mixing of the agricultural chemicals AC1 and AC2. It will, of course, be realized by those skilled in the art that more than two such compartments may be provided so as to hold more than two dissimilar chemicals, in which case further dividing walls 14 would be present within the interior of the tank 12.

The tank 12 is provided with chemical supply ports 12a and 12b which allow the agricultural chemicals to be introduced into the holding compartments HC1 and HC2, respectively. Each of the supply ports 12a and 12b is closed by means of a vapor-tight cover 16a and 16b so as to prevent escape of the agricultural chemicals AC1 and AC2, respectively. The liquid level of each of the agricultural chemicals AC1 and AC2 within the holding compartments HC1 and HC2 may be determined by float level indicators 18a, 18b which respectively include a level float 18a', 18b' disposed within each of the holding compartments HC1 and HC2, and operatively connected to a sight level gauge 18a", 18b" disposed on the exterior of the tank 12.

The tank 12 is most preferably supported by pairs of support posts 20a, 20b which are rigidly connected to the tank 12 at upper ends thereof and to a support platform 22 at lower ends thereof. The support poses 20a, 20b are, moreover, of a sufficient length to provide for space to accommodate a cylinder 24 containing a source of pressurizing fluid (e.g., nitrogen gas) which serves to contain the liquid agricultural chemicals AC1 and AC2 under pressure and allows them to be forcibly transferred to the supply tank ST associated with the crop applicator equipment CA without necessarily requiring mechanical pumping means.

A manifold assembly 26 is mounted onto the tank 12 and is preferably contained within a security cover 27 (see also FIG. 1) to prevent unauthorized dispensing and/or tampering with the contents of the tank 12. As will be described in greater detail below, the manifold 26 distributively fluid-connects the pressurizing fluid of the cylinder 24 to each of the holding compartments HC1 and HC2 as well as providing a means by which the liquid agricultural chemicals AC1 and AC2 may simultaneously be withdrawn from their respective holding compartments HC1 and HC2, mixed with one another and then transferred via the transfer conduit TC to the spray tank ST associated with the crop applicator equipment CA. In this regard, the pressurizing fluid contained within the cylinder 24 is supplied to the manifold assembly 26 via the pressurizing riser 28, while each of the liquid agricultural chemicals AC1 and AC2 is supplied separately to the manifold assembly 26 via liquid supply risers 30 and 32, respectively. The liquid supply risers 30, 32 may be open at their lower ends and submerged below the liquid level of the agricultural chemicals AC1 and AC2, respectively. However, for purposes of structural integrity, it is preferred that each of the risers 30, 32 extend completely through the interior of the respective holding compartments HC1 and HC2, with inlet apertures 30a and 32a being provided near the bottom of tank 12. The pressurizing riser 28 is fluid-connected to the cylinder 24 via supply conduit 34 provided with a shutoff valve 36.

Figure 3:
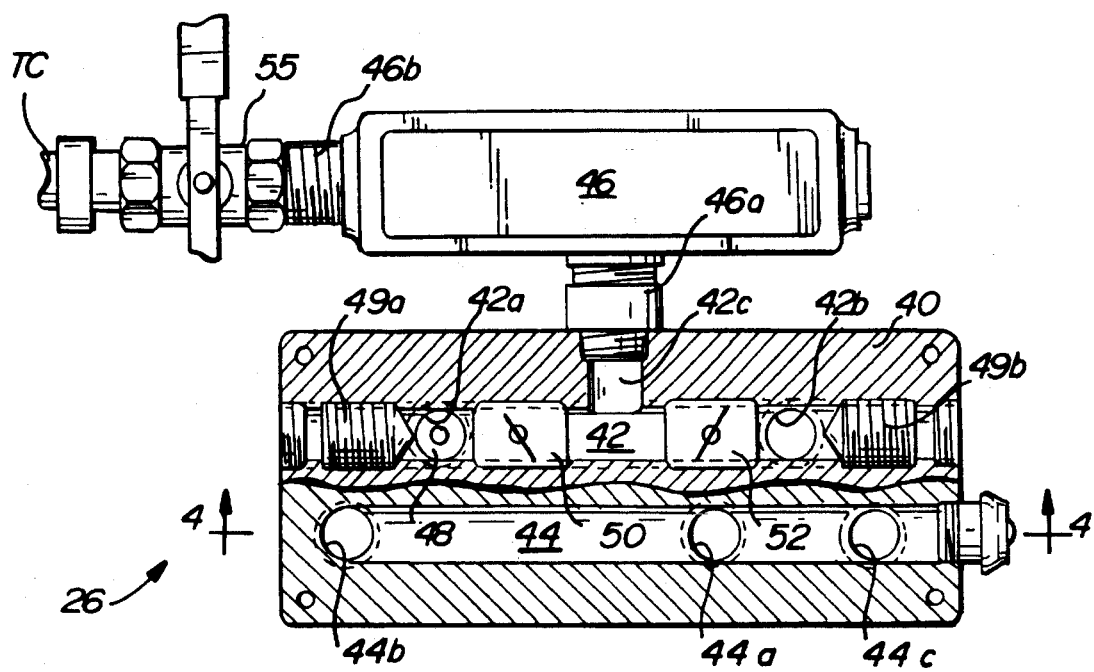
FIG. 3 is a cross-sectional plan view of a pressurization/mixing manifold assembly employed with the multi-compartment tank system in accordance with the present invention.
Figure 4:
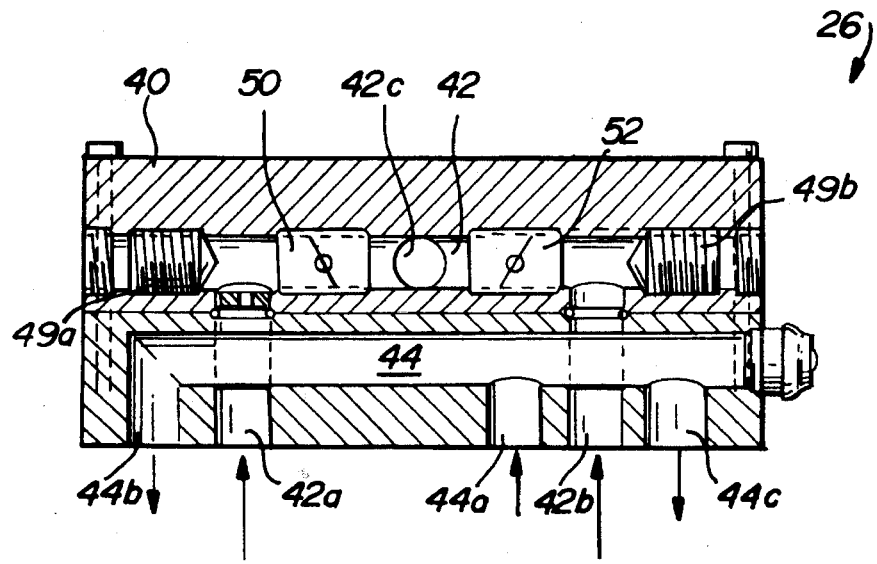
FIG. 4 is a cross-sectional elevational view of the manifold assembly shown in FIG. 3 as taken along line 4—4 therein.

The structural details of the manifold assembly 26 are better shown in accompanying FIGS. 3 and 4. As is seen, the manifold assembly 26 includes a housing block 40 which establishes interior liquid and gas distribution channels 42 and 44, respectively. The gas distribution channel 44 is fluid-connected to a gas-receiving port 44a and, depending upon the number of isolated holding chambers within the interior of tank 12, to a pair of gas-discharge ports 44b and 44c, the latter in turn being fluid-connected with the holding compartments HC1 and HC2 via nipples 42d and 42e, respectively (see FIG. 2). On the other hand, the liquid distribution channel 42 is fluid-connected to each of the liquid supply risers 30, 32 via inlet ports 42a, 42b, respectively, and to a mixing unit 46 via discharge port 42c.

A restrictive orifice 48 may be disposed in inlet port 42a so that the desired volume of liquid agricultural chemical AC1 is, supplied to the distribution channel 42 and mixed in proper ratio to the liquid agricultural chemical AC2 supplied via inlet port 42b. Additionally or alternatively, metering of the liquid agricultural chemicals may be provided by metering screws 49a, 49b threadably coupled within the distribution channel 42. One-way flow valves 50, 52 are disposed in the liquid distribution channel 42 between the inlet ports 42a, 42b and the discharge port 42c, so as to prevent back-flow of the agricultural chemicals AC1 and AC2, respectively.

Since the liquid agricultural chemicals AC1 and AC2 are introduced into the distribution channel 42 in direct axial opposition to one another, some mixing will occur prior to being discharged from the manifold 26 via discharge port 26c. However, it is preferred that a further mixing unit 46 be fluid connected at its inlet and discharge nipples 46a and 46b to the discharge port 42c and a proximal shut-off valve 55. Most preferably, the inlet and discharge nipples 46a, 46b, respectively will be oriented at right angles to one another. As a result, the preliminarily mixed liquid agricultural chemicals AC1 and AC2 discharged from port 42c will enter the mixing chamber (not shown) defined within the mixing unit 46 and, by virtue of the right angle orientation of the inlet and discharge nipples 46a and 46b, respectively, will be further mixed in a turbulent manner therewithin. The now thoroughly mixed agricultural chemicals AC1, AC2 will then flow through the transfer conduit TC to the spray tank ST associated with the crop applicator equipment CA. The flow of the mixed agricultural chemicals can be ascertained visually by a suitable flow meter FM (see FIG. 2).

The one-way flow coupling FC provided at the distal end of the transfer conduit TC is shown specifically in accompanying FIG. 5. In this regard, a distal shut-off valve 58 is disposed in-line with the transfer coupling TC and serves to complement the shut-off functions provided by the proximal valve 55 depicted in FIG. 3. The flow coupling FC is most preferably a female coupling 60 which mates with the male coupling 62 associated with the supply nipple 64 of the supply tank ST. Flow stops 60a and 62a are disposed in the couplings 60, 62 and are maintained in a fluid-tight seal therewithin by virtue of tension and compression springs 60b, 62b, respectively. Therefore, when disconnected or when the mixture of agricultural chemicals AC1 and AC2 is not flowing within the transfer conduit TC (e.g., by virtue of the shut-off valves 55 and/or 58 being closed), the flow stops will be seated in a fluid-tight manner within the couplings 60 and 62, respectively. However, under influence of the flow of agricultural chemical mixture, each of the flow stops 60a and 62a will unseat against the bias force of their respective springs 60b and 62 be thereby allowing the agricultural chemical mixture to be introduced into the supply tank ST. In such a manner, the mixture of agricultural chemicals may be introduced into the supply tank ST without exposure to the user.

In use, the pressurizing fluid will be transferred from the cylinder 24 and distributed equally between the holding compartments HC1 and HC2 by virtue of the manifold assembly 26. As a result, when a mixture of the agricultural chemicals AC1 and AC2 is desired to be introduced to the supply tank ST, the flow coupling FC associated with the transfer conduit TC will be mated with the coupling 62 associated with the supply tank's nipple 64. The valves 55 and 58 may then be opened. Since the liquid agricultural chemicals AC1 and AC2 within each of the holding compartments HC1 and HC2 will be under substantially equivalent pressure by virtue of the pressurizing fluid, they will each be forcibly expelled from the holding compartments HC1 and HC2, through risers 30, 32, respectively. Metering of the flow of liquid agricultural chemicals AC1 and AC2 is provided by the orifice 48 and/or via metering screws 49a, 49b so that the proper desired ratio of agricultural chemicals are mixed within channel 42 and the mixing unit 46.

As can now be appreciated, the present invention provides a "closed" system whereby at least two dissimilar liquid agricultural chemicals may be stored in isolation to one another. Moreover, the present invention allows such agricultural chemicals, or other dissimilar liquids, to be mixed in a "closed" system just prior to usage without endangering the user with exposure to such mixture. As a consequence, many (if not all) of the problems noted previously with respect to mixtures of agricultural chemicals can be alleviated by virtue of this invention.

However, while the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A portable holding and mixing tank system for at least two dissimilar liquids comprising:

at least two fluid-isolated holding compartments each of which is adapted to hold a respective dissimilar liquid;

a source of pressurizing fluid;

a manifold assembly which includes a housing block integrally defining a liquid channel for the dissimilar liquids and a pressurization fluid channel for said pressurizing fluid, said liquid channel and said pressurization fluid channel being fluid-connected to each of said holding compartments;

a pressurizing supply conduit which fluid-connects said source of pressurizing fluid to said pressurizing fluid channel;

liquid supply risers each of which is disposed in a respective one of said holding compartments and thereby fluid-connect said respective one of said holding compartments to said liquid channel defined by said housing block of said manifold assembly; and a liquid discharge port fluid-connected to said liquid channel defined by said housing block of said manifold assembly; wherein said at least two dissimilar liquids within each said holding compartment are capable of being forcibly introduced by means of said pressurizing fluid therewithin into said liquid channel defined by said housing block of said manifold assembly and thereby mixable with one another within said liquid channel prior to discharge through said discharge port.

2. A system as in claim 1, further comprising a mixing unit fluid-connected to said discharge port for enhancing the mixing of said dissimilar liquids discharged thereinto.

3. A system as in claim 2, wherein said mixing unit has an inlet nipple fluid-connected to said discharge port, and a discharge nipple, and wherein said inlet and discharge nipples are oriented substantially at right angles to one another.

4. A system as in claim 1, wherein said liquid supply risers are rigid conduits extending entirely through said respective one of said holding compartments, and wherein said rigid conduits include an inlet aperture disposed near a bottom end thereof.

5. A system as in claim 1, wherein said pressurizing fluid channel includes at least one pair of pressurizing fluid discharge ports and a pressurizing fluid inlet port disposed between said at least one pair of pressurizing fluid discharge ports, and wherein said pressurizing fluid supply conduit is connected to said pressurizing fluid inlet port.

6. A system as in claim 1, further comprising level gauges for allowing visual determination of liquid level within each of said holding compartments.

7. A system as in claim 1, wherein said manifold assembly includes a metering structure for metering at least one of said dissimilar liquids in relation to another of said dissimilar liquids.

8. A system as in claim 7, wherein said metering structure is a restrictive orifice.

9. A system as in claim 7, wherein said metering structure is a metering screw.

10. A system as in claim 1, wherein said manifold assembly includes one-way flow valves disposed in said liquid channel for preventing back-flow of said dissimilar liquids into said holding compartments.

11. A system as in claim 1, further comprising a flexible transfer conduit fluid connectable at a proximal end thereof to said discharge port and includes at a distal end thereof a flow coupling for fluid-connecting said transfer conduit to another tank.

12. A system as in claim 11, wherein said flow coupling includes a flow stop which forms a fluid-tight seal in the absence of liquid flow through said transfer conduit.

13. A system as in claim 12, wherein said flow coupling includes a bias spring for biasing said flow stop in a direction to form said fluid-tight seal.

14. A system as in claim 13, wherein said biasing spring is a tension spring.

15. A system as in claim 1, wherein said tank includes supply ports for allowing dissimilar liquids to be introduced separately into said holding compartments.

16. A system as in claim 15, wherein each of said supply ports includes a removable cover.

17. A system as in claim 1, which comprises a tank having an interior space and a dividing wall therein which establishes said at least two fluid-isolated holding compartments within said tank interior space.

* * * * *